United States Patent [19]

Mayeux et al.

[11] 4,065,671
[45] Dec. 27, 1977

[54] DEVICE FOR DETECTING X-RAY RADIATION

[75] Inventors: Christian Mayeux; François Micheron; Jean Pierre Vasseur, all of Paris, France

[73] Assignee: Thomson-CSF, Paris, France

[21] Appl. No.: 671,964

[22] Filed: Mar. 30, 1976

[30] Foreign Application Priority Data

Mar. 25, 1975 France .................................. 75.09320

[51] Int. Cl.² .............................................. G01T 1/22
[52] U.S. Cl. .................................. 250/370; 250/315 R
[58] Field of Search ..................... 250/370, 371, 315 R

[56] References Cited

U.S. PATENT DOCUMENTS 3,689,782  9/1972  Epszein ........................... 250/370 X Primary Examiner—Davis L. Willis
Attorney, Agent, or Firm—Cushman, Darby & Cushman

[57] ABSTRACT

The invention relates to X rays detection devices, either for dose metering purposes or for display purposes. The device in accordance with the invention comprises a thin plate of ferroelectric material upon the faces of which electrical charges are deposited. X ray radiation produces an increase in the conductivity of the material and, consequently, modulation of the distribution of the charges, determination of which furnishes the desired detection.

13 Claims, 8 Drawing Figures

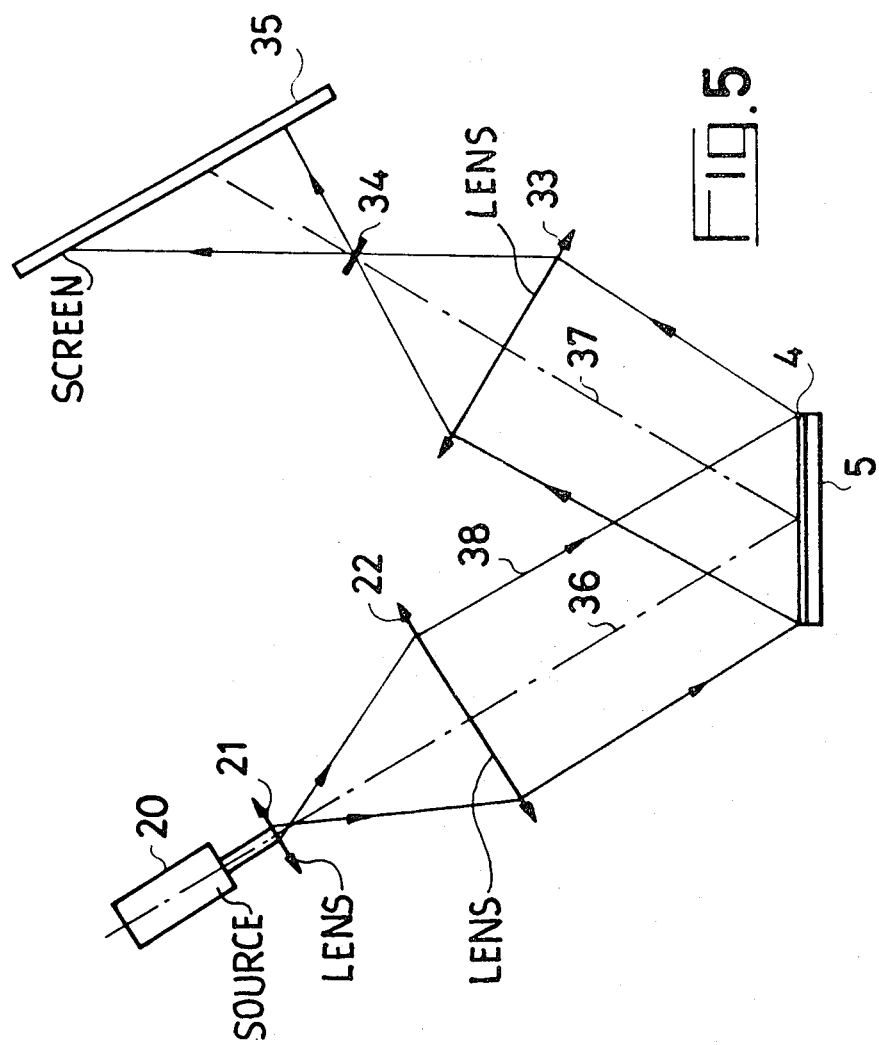

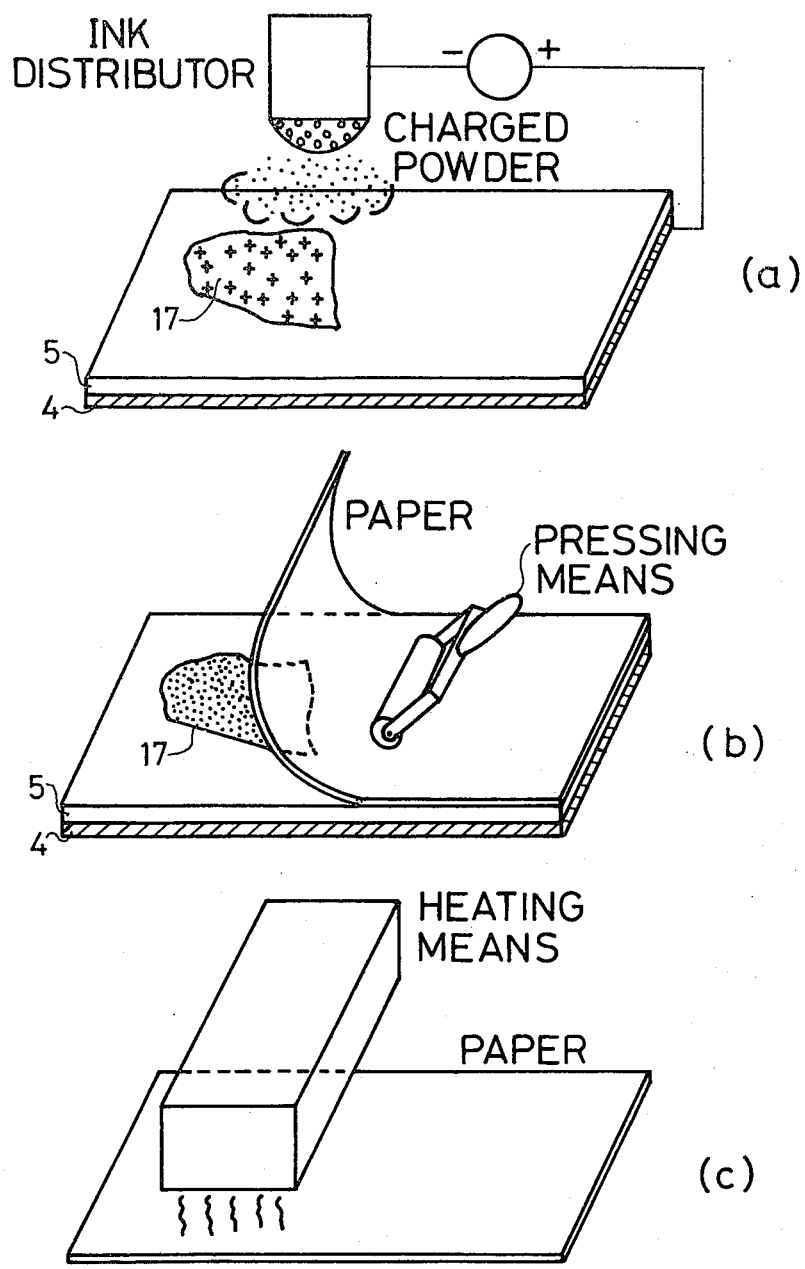

DEVICE FOR DETECTING X-RAY RADIATION

The present invention relates to X ray detection systems for use in both dosimetric and display applications.

To evaluate the X ray dose received over a given period of time, it is a known technique to employ devices which utilise either the phenomenon of a gas discharge of the kind occurring on impact of the X rays being measured (a device of the ionisation chamber kind, a Geiger-Muller counter or proportional counter) or scintillator crystals, or again photoconductor cells (photovoltaic or photoresistive cells).

In order to display the spatially variable transparency of an object at X ray wavelengths conventional fluorescent screens or image intensifier tubes, or, again, X ray sensitive photographic emulsions, are used.

These known devices have various drawbacks, amongst which one can point to the high background noise, in particular in the case of photoconductor cells, and too high a persistance which results in a smearing effect in display devices, in particular fluorescent screen devices.

In accordance with the present invention there is provided an X ray detector device which does not exhibit these drawbacks. To this end, a ferroelectric material highly absorptive vis-a-vis X rays, and having a low dielectric constant and a low dark electrical conductivity (this latter parameter being substantially increased when X ray irradiation takes place) is used. The material is employed for example in the form of a thin wafer, having a thickness of the order of some few hundreds of microns, upon the surfaces of which electrical charges are deposited. The X ray irradiation produces an increase in the conductivity of the material and consequently modulates the charge distribution. The determination of this modulated distribution, produces the required detection.

The object of the present invention is a device for detecting X ray radiation comprising: a plate of ferroelectric material positioned for receiving said X ray radiation on one of its major faces; said ferroelectric material being capable of absorbing the major parts of said X ray radiation over a given depth said ferroelectric material having a conductivity increasing under the effect of said X ray radiation; said device further comprising biasing means for providing electrical charges at least at one of the major faces of said plate, and charge detection means for sensing the variation in the amount of said electrical charges resulting from the conductivity increase caused by the X ray radiation dose received by said plate; the thickness of said plate being selected to match said depth.

In a first embodiment, this system is used in order to determine received X ray doses. In a second embodiment, it is used to display the non-uniform transparency of an object vis-a-vis X rays.

For a better understanding of the present invention and to show how the same may be carried into effect, reference will be made to the ensuing description and the following drawings among which:

FIGS. 4 and 5 illustrate two variant forms of the second embodiment referred to above.

FIG. 6 illustrates at (a) (b) and (c) three steps of a xerographic method.

In these various figures, similar elements are marked by the same references.

Figure 1:
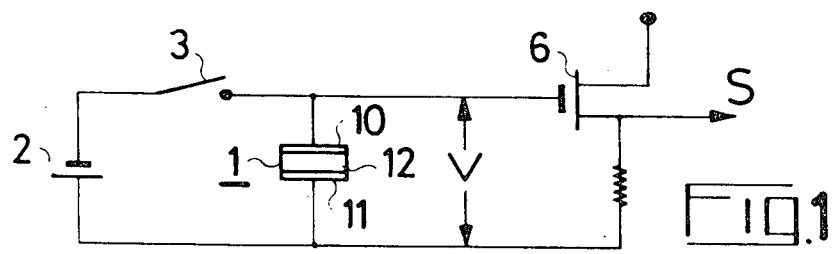
FIG. 1 illustrates a first embodiment of an X ray detector supplying a dose indication.

FIG. 1 shows the detector 1 constituted by a ferroelectric material 12 capable of absorbing X ray radiation, arranged between two electrodes 10 and 11. The detector 1 is electrically connected to an electrical source 2 furnishing a voltage U across a switch 3. The voltage (V) across the terminals of the capacitor formed by the detector 1 can be measured by means of an amplifier having a very high input impedance, as for example a MOS type field-effect transistor 6, supplying an effective output signal S at one of its connections.

The operation of this device is as follows:

The capacitor 1 is charged by the source 2, the switch 3 being closed. In the absence of any X ray radiation, turning off the switch 3 causes the capacitor 1 to discharge slowly with a time constant $T_o = \epsilon/\sigma$, where $\epsilon$ is the dielectric constant of the material 12 and $\sigma$ is the conductivity of this material in the absence of X ray radiation. The discharge is therefore the slower the lower the conductivity $\delta$.

X ray radiation received by the device 1, will interact with the material 12 in the manner which will be familiar to those skilled in the art, and creates free electrons with a consequent increase in the conductivity of the material by an amount proportional to the received X ray dose. The capacitor 1 then discharges with a time constant $T = \epsilon/\sigma$ which is much shorter.

Figure 2:
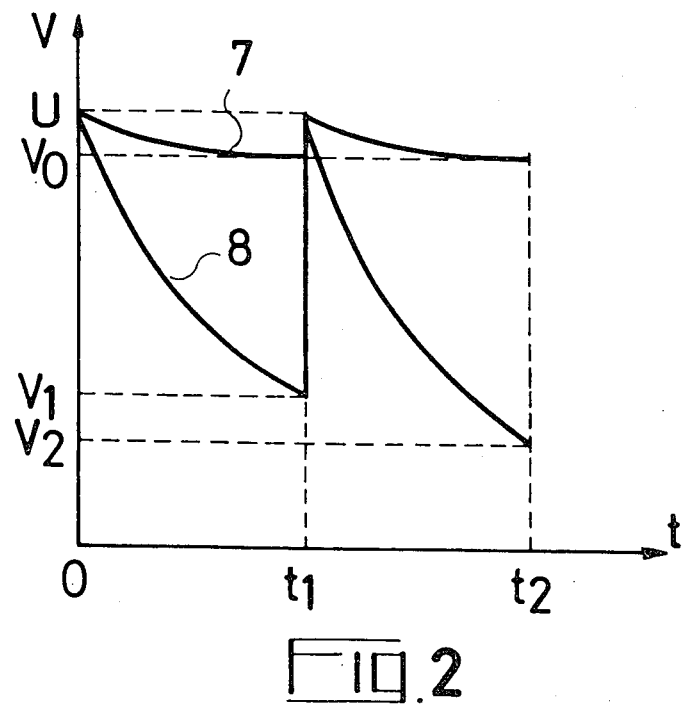
FIG. 2 is a diagram illustrating the operation of the device of FIG. 1.

In FIG. 2, the variation in the voltage V across the terminals of the capacitor 1 has been shown. At the initial instant, the capacitor has a voltage U across its terminals. In the absence of any X ray radiation, its charge decreases exponentially with the time constant $T_o$, down to a voltage $V_o$ at the instant $t_1$ (graph 7). In the presence of X rays, the discharge is faster (graph 8) and at the end of the time $t_1$ the voltage across its terminals is only $V_1$. At the instant $t_1$, the capacitor is recharged (the charging time being neglected in the diagram) and between the instants $t_1$ and $t_2$ an increase in the incident X ray dose has been illustrated: the increase in the conductivity is proportional to the received dose of X rays, the potential difference which remains across the terminals of the capacitor 1 being $V_2 < V_1$.

It will be observed that measurement of the potential across the terminals of the capacitor therefore furnishes the X ray dose received by the device over a given interval of time, that is to say that we are dealing here with an integrating measuring device.

More precisely, the decrease in the potential difference is exponential:

$$V = U. \exp.(-t/T)$$

where $T = \epsilon/\sigma = \epsilon/(\sigma + KI)$ the constant $K$ expressing the proportionality relationship between the increase in conductivity and the received X ray flux $I$, that is to say the X ray absorptivity of the material in question.

After a time $t < T$ and assuming that the time constant is much longer than the same time constant when taken in the presence of X rays(T), the relationship between the potential difference and the received X ray quantity is expressed as:

$$(\Delta V/U \simeq (KI/\epsilon \cdot t$$

where $\Delta V = U - V_1$ from which I can be deduced knowing $\epsilon$ and K which are characteristics of the material 12 and, in the case of K, also a function of the dimensions of the material.

For accuracy of measurement, it is of course desirable that $\Delta V$ should be large that is to say, in particular, that the dielectric constant of the material used should be small and that the coefficient K should be large.

As far as the dielectric constant is concerned, a ferroelectric material will suit excellently for the production of the layer 12 provided that its operating temperatures is very much lower than its Curie temperature; those skilled in the art will be aware, in other words, that the graph of variation of the dielectric constant $\epsilon$ of this kind of material as a function of temperature, has a very marked peak at a temperature equal to its Curie temperature. The values of the dielectric constant $\epsilon$ are then of the order of some hundreds of units at the most.

As far as the constant K is concerned, a ferroelectric material will also suit excellently because its lattice contains heavy ions and therefore produces high X ray absorption; by way of example, lead lanthanum zirconium titanate (PLZT) absorbs around 50 % of the energy of a 50 KeV X ray beam at a thickness of 100 microns, and if it is used at a temperature very much lower than its Curie tempertature, then its dielectric constant $\epsilon$ is of the order of 20 to 50 units.

Moreover, and whatever the material which is chosen, the constant K varies with the thickness of the layer 12; for an optimum thickness it passes through a peak located between two zero values. In fact, the constant K is zero for a zero thickness since the absorption is zero and tends towards zero again as the thickness tends towards infinity since the ratio of absorptive volume (being the only volume for which the conductivity is increased) to total volume, tends towards zero.

Another embodiment of the above device is possible, in which the integrating properties of the device are not called upon.

To this end, the capacitor 1 is arranged in series between the supply 2 and a measuring device, for example a current-measuring device. X ray irradiation produces an increase in the conductivity of the capacitor 1 and, consequently, since the element 1 then operates as a photoresistive element, an instantaneous indication of current is furnished by the measuring device.

Figure 3:
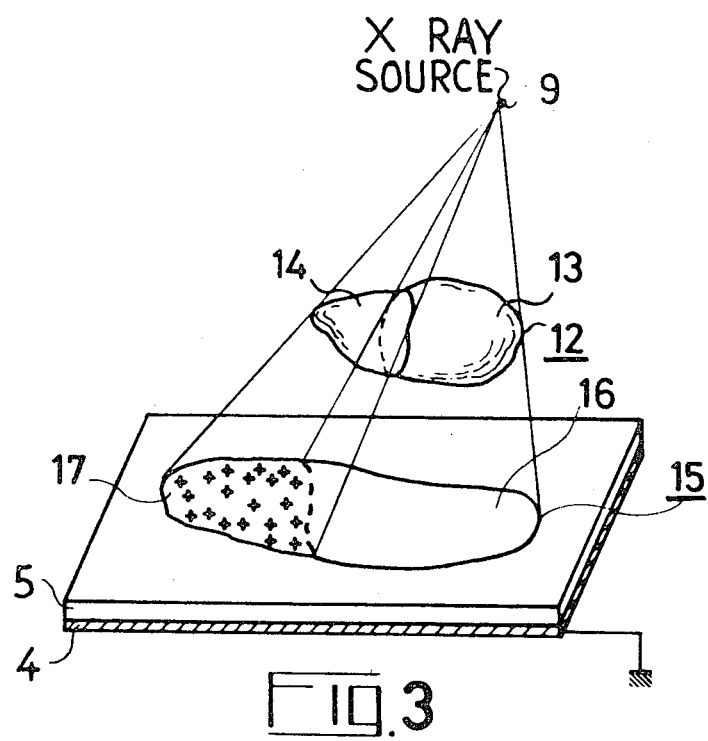
FIG. 3 is a diagram illustrating the principle of a second embodiment of an X ray detector displaying a visible pattern corresponding to the non uniform transparency of an object vis-a-vis X rays.

FIG. 3 is a diagram of a second embodiment of an X ray detector, in which display of the non-uniform transparency of an object vis-a-vis X rays, is obtained.

It comprises a plate 5 of an X ray absorptive material, preferably a ferroelectric material such as zirconium-lead barium titanate, etc. covered on one of its faces by an electrode 4 connected to a reference potential. An X ray source 9 irradiation an object 12 whose projection on to the plate 5 has been marked 15.

The operation of this device splits into three phases.

First of all, charges are deposited over the whole of the area of the plate 5 in accordance with a given distribution. This can be performed for example by means of a second electrode, arranged at a certain interval above the plate and placed at a high potential, the ionisation of the air occurring in its neighbourhood, gives rise to the formation of free charges which deposit at the surface of the material 5. This deposition of charges can also be performed with the help of a conductor moved from one end of the plate to the other and giving a more uniform charge distribution, or again with the help of a grid which dispenses with the need for movement of the electrode. The charges thus deposited have a lifetime which depends upon the conductivity of the material in the dark state. In the case of the ferroelectric materials referred to earlier, the discharge time constant is sufficiently long (some hours) in relation to the measurement time.

During a second phase, the object 12 is irradiated with X rays. To simplify matters, the object is assumed to be constituted by two zones, 13 and 14, one of them partially transparent vis-a-vis X rays and the other totally absorbent vis-a-vis X rays. The zones 13 and 14 are projected on to the plate 5 in the form of respective areas 16 and 17. As explained above, the zone 17 which receives no X rays, experience no change in conductivity (the conductivity remains $\sigma$) and retains its charge which is positive in the example shown in the figure. The zone 16, on the other hand, receives X rays and, since its conductivity increases, its charge reduces. The area outside the contour 15, which is illuminated by the X rays, totally loses its charge.

Thus, a spatial distribution of charges at the surface of the plate 5 is obtained, which distribution is a function of the absorption (spatially non-uniform) of X ray by the object 12 and therefore furnishes an image of the object 12.

During a third phase, this charge distribution is detected in order to display resultant image of the object 12. This detection can be performed electrically or optically for example.

Amongst the electrical methods of display, we can point to the xerographic method whose steps are illustrated in FIG. 6, and which consists in spreading ink in the form of a charged powder over the plate 5, the powder containing a thermosetting plastic material, which distributes as a function of the spatial charge density on the plate, and in then pressing a sheet of paper into contact with it, which paper is then heated so that the thermosetting material fixes the ink to the object image thus obtained. The advantage of this method is its good spatial resolution.

Another electrical display method consists in measuring the variations in the charge density at the surface of the plate 5 by means of an electrostatic voltmeter. The spatial resolution depends in this case upon the geometry of the pick-up head of the voltmeter.

Figure 4:
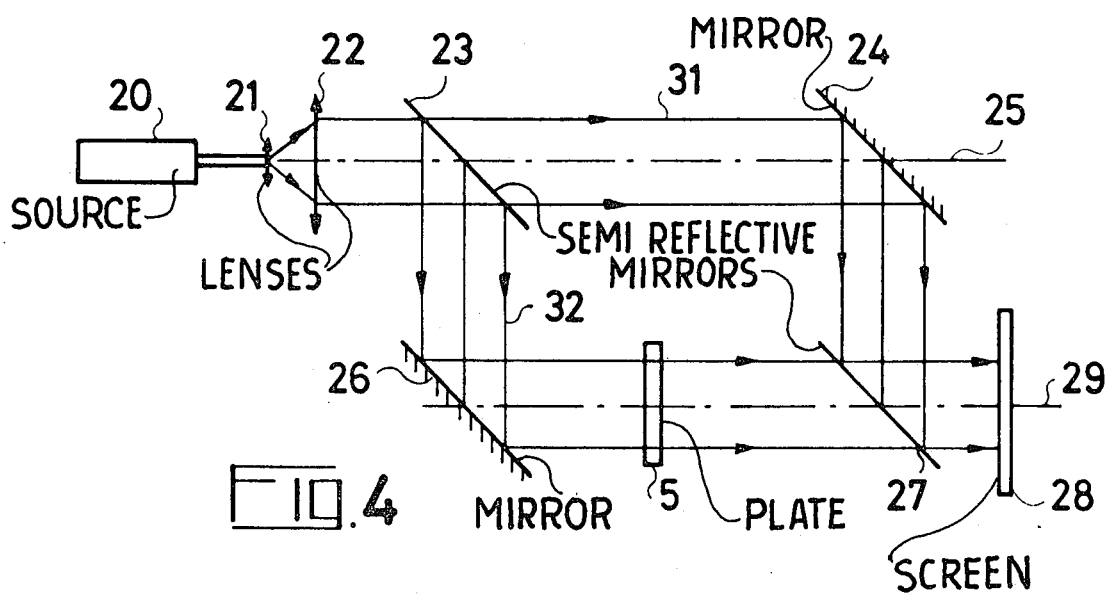

Amongst the optical display methods which are possible, if the material is transparent, it is possible for example to exploit its electro-optical properties as indicated in FIG. 4. This figure is the diagram of an optical system making it possible to display the variation in the double-refraction properties of the plate 5 shown in FIG. 3. In other words, the non-uniform charge at the surface of the plate 5 produces a likewise non-uniform polarization inside the ferroelectric material of which the plate is made, this polarization varying between the spontaneous and the saturated which itself induces a variation in the double-refraction properties.

FIG. 4 thus illustrates an interferometer comprising for example a monochromatic light source 20 such as a laser, and a set of two lenses 21 and 22 in order to spread the beam of axis 25 coming from the source 20; this beam is split by a semi-reflective mirror 23 into two beams 31 and 32. The beam 31 is transmitted by the plate 23 along the axis 25. The beam 32 is reflected at 90° to the axis 25 by the plate 23 on the mirror 26 which directs it along an axis 29, parallel to that 25, on to the plate 5. The beam 32 is then directed, through a semi-reflective plate 27, on to a screen 28 on to which the beam 31 is likewise directed after having been reflected by a mirror 24 (inclined at 45° to the axis 25) and by the plate 27 (inclined at 45° to the axis 29). Thus, on the screen 28, an interference pattern is obtained representing the spatial variation in the double-refraction property of the plate 5 and consequently displaying the charge distribution at the surface of the plate 5. In this case, in order to obtain better constrast in the interference pattern obtained, a ferroelectric PLZT material around 300 microns thick can be used, illuminated by a monochromatic light beam whose wavelength is of the order of 0.6 microns; the variation in double refraction obtained, that is to say the difference between the ordinary and extraordinary refractive indices of the material, is of the order of $10^{-3}$.

Another method of optical display utilises the piezoelectric effect exhibited by certain ferroelectric materials. FIG. 5 illustrates a system making it possible by a striation technique to display mechanical distortions undergone by the plate 5 due to piezoelectric effect.

This arrangement comprises the monochromatic light source 20 and the two lenses 21 and 22 which furnish an expanded light beam 38 having the axis 36. This beam is reflected from the metallised coating 4 on the plate 5 along an axis 37 symetrical to that 36 in relation to the normal to the plate 5. A lens 33 causes the beam 38 to converge geometrically at a point on the axis 37, at which a small screen 34 is located; that part of the beam 38 not stopped by the screen 34 forms upon a screen 35 arranged in a plane which is the conjugate of the plate 5 in relation to the lens 33, the image of the distortions in the plate 5.

In other words, as those skilled in the art will appreciate, on the one hand the plate 5 distorts mechanically due to piezoelectric effect, under the action of the electrical charges distributed over its surface (that of its surfaces opposite to the one upon which the metallised coating 4 is located) and on the other hand the light wave, after reflexion at the plate 5, can be considered as being due to the superimposition of two waves: the principal wave, not having undergone the optical path irregularities due to the distortions in the plate 5, and a secondary wave whose amplitude remains small and varies locally, proportionally to the local variations in the optical trajectory. The function of the small screen 34 is to stop the major part of the energy contained in the principal wave in order to improve the contrast of the image observed upon the display screen 35, giving it for example a circular from and a dimension such that it covers the central spot and the first diffraction rings produced by said principal wave; the secondary wave diffracted by the variations in the optical trajectory due to the object, is not stopped by the screen 34 and produces upon the display screen 35 local illumination levels which are a function of the distortions in the plate 5.

In this embodiment, the material used to manufacture the plate 5 must exhibit a sufficiently strong piezoelectric effect to achieve good contrast on the screen 35. Typically, the maximum amplitudes of the mechanical distortions in the plate 5, these being created by the non-uniform distribution of the charges at its surface, should be in the order of half a wavelength of the read-out light beam 38. This leads to piezoelectric coefficients ($d33$) of the order of $1.5 \times 10^{-10}$ m/V and therefore to materials such as barium titanate or lead-zirconium titanate (for example Pb $(Zr_{0.52}Ti_{0.38})O_3$).

A display device of the kind described hereinbefore has numerous advantages in the analysing of objects or living bodies by means of X rays, amongst which one can point to the facility for the direct production of prints of the image on paper, without the need to interpose the developing of a film, or, again, the limitation of the X ray exposure time to the time required in order to discharge the plate, or, again, the possibility of obtaining large analysis areas with materials such as Pb $Zr_nTi_{1-n}O_3$ which can be produced in the form of large-area plates.

What we claim is:

1. A device for detecting X ray radiation comprising: a plate of ferroelectric material positioned for receiving said X ray radiation on one of its major faces; said ferroelectric material being capable of absorbing the major part of said X ray radiation over a given depth; said ferroelectric material having a conductivity increasing under the effect of said X ray radiation; said device further comprising biasing means for providing electrical charges at least at one of the major faces of said plate and charge detection means for sensing the variation in the amount of said electrical charges resulting from the conductivity increase caused by the X ray radiation dose received by said plate; the thickness of said plate being selected to match said depth.

2. A device as claimed in claim 1, wherein said thickness is at the most around some few hundreds of microns.

3. A device as claimed in claim 1, wherein said ferroelectric material is lead-lanthanum zirconium titanate.

4. A device as claimed in claim 1, wherein the working temperature of said plate is substantially different from the Curie temperature of said ferroelectric material.

5. A device as claimed in claim 1, wherein said biasing means comprise two electrodes located on the major faces of said plate for building up a capacitor cell and electrical means connected to said electrodes for charging said capacitor cell at given instants.

6. A device as claimed in claim 5, wherein said charge detection means comprise voltage measuring means carrying out measurements of the potential difference across the terminals of said capacitor cell prior to and after irradiation of said plate by said X ray radiation, the difference between said measurements supplying an indication corresponding to the received X ray radiation dose.

7. A device as claimed in claim 1, for displaying the non-uniform transparency of an object positioned for modulating said X ray radiation wherein said plate is covered on one of its major faces by an electrode; said biasing means comprising means for uniformly depositing electrical charges on the other of said major faces; said charge detection means being arranged for displaying an indication representative of the spatial distribution of said electrical charges after irradiation of said plate by the X ray radiation transmitted by said object.

8. A device as claimed in claim 7, wherein said charge detection means comprise means for distributing upon said plate ink in the form of a charged powder containing a thermosetting material, means for pressing a sheet of paper into contact with said plate, and means for heating said sheet of paper once coated with said ink.

9. A device as claimed in claim 7, wherein said charge detection means comprise an electrostatic voltmeter furnishing a plot of said spatial distribution of electrical charges.

10. A device as claimed in claim 7, wherein said charge detection means comprise an optical inferometer arrangement for displaying said spatial distribution of electrical charges; said optical interferometer arrangement being responsive to the variation in refractive index induced by said spatial distribution of electrical charges; said optical interferometer arrangement comprising means for supplying two fractions of a monochromatic light beam, one of said fractions constituting a reference beam; the other of said fractions being spatially modulated by transmission across said plate.

11. A device as claimed in claim 7, wherein said ferroelectric material is a piezoelectric material; said charge detection means comprise an optical display arrangement based on the striated technique; said opticl display arrangement comprising means for supplying a parallel monochromatic light beam incident upon said plate and reflected therefrom, lens for causing said reflected beam to converge geometrically at a given point, a mask located at said point, and a display screen arranged in relation with said lens, to collect an image of said plate.

12. A device as claimed in claim 11, wherein said ferroelectric material is barium titanate.

13. A device as claimed in claim 11, wherein said ferroelectric material is lead-zirconium titanate.

* * * * *